United States Patent
Park et al.

(10) Patent No.: US 8,180,282 B2
(45) Date of Patent: May 15, 2012

(54) SYSTEM AND METHOD FOR CONTROLLING POWER IN A COMMUNICATION SYSTEM

(75) Inventors: Dae-Young Park, Seoul (KR); Tae-Hyuk Kang, Goleta, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1201 days.

(21) Appl. No.: 11/998,546

(22) Filed: Nov. 30, 2007

(65) Prior Publication Data

US 2008/0132166 A1 Jun. 5, 2008

(30) Foreign Application Priority Data

Nov. 30, 2006 (KR) .................. 10-2006-0119735

(51) Int. Cl.
*H04B 7/14* (2006.01)
(52) U.S. Cl. ............ 455/15; 455/11.1; 455/69; 455/24; 455/522; 370/315; 370/318; 370/501; 375/132; 375/211
(58) Field of Classification Search .................. 455/15, 455/7, 11.1, 13.1, 69, 20, 24, 522, 455, 445; 370/315, 318, 498, 501; 375/130, 132, 211
See application file for complete search history.

(56) References Cited

U.S. PATENT DOCUMENTS

| | | | | |
|---|---|---|---|---|
| 6,141,533 A * | 10/2000 | Wilson et al. | ................ | 455/11.1 |
| 6,996,368 B2 | 2/2006 | Orlik et al. | | |
| 2004/0192204 A1 * | 9/2004 | Periyalwar et al. | ............. | 455/25 |
| 2004/0198467 A1 * | 10/2004 | Orlik et al. | ..................... | 455/574 |
| 2005/0014464 A1 * | 1/2005 | Larsson | ........................ | 455/11.1 |
| 2005/0059342 A1 * | 3/2005 | Engels et al. | ..................... | 455/7 |
| 2006/0003703 A1 * | 1/2006 | Yahagi | ............................. | 455/69 |
| 2006/0205340 A1 * | 9/2006 | Cho et al. | ..................... | 455/11.1 |
| 2008/0080436 A1 * | 4/2008 | Sandhu et al. | ................. | 370/338 |
| 2008/0285499 A1 * | 11/2008 | Zhang et al. | .................. | 370/315 |
| 2009/0047916 A1 * | 2/2009 | Haykin | ....................... | 455/115.1 |

FOREIGN PATENT DOCUMENTS

| | | |
|---|---|---|
| KR | 1020030057467 A | 7/2003 |
| KR | 1020070117125 A | 12/2007 |
| KR | 1020080017629 A | 2/2008 |

* cited by examiner

*Primary Examiner* — Shaima Q Aminzay

(57) ABSTRACT

A method and system for controlling power in a communication system are provided, in which an relay station calculates the capacity of a first channel between a base station and the relay station, an mobile station calculates the capacity of a second channel between the relay station and the mobile station, the mobile station notifies the relay station of the capacity of the second channel, and the relay station calculates a power control value according to the capacity of the first channel and the capacity of the second channel.

24 Claims, 3 Drawing Sheets

SYSTEM AND METHOD FOR CONTROLLING POWER IN A COMMUNICATION SYSTEM

CROSS-REFERENCE TO RELATED APPLICATION AND CLAIM OF PRIORITY

The present application claims the benefit under 35 U.S.C. §119(a) of a Korean Patent Application filed in the Korean Intellectual Property Office on Nov. 30, 2006 and assigned Serial No. 2006-119735, the entire disclosure of which is hereby incorporated by reference.

TECHNICAL FIELD OF THE INVENTION

The present invention generally relates to a communication system. More particularly, the present invention relates to a system and method for controlling power in a multi-hop communication system.

BACKGROUND OF THE INVENTION

Active studies have been conducted on providing high-speed services with different Quality of Service (QoS) requirements to users in future-generation communication systems. A major future future-generation communication system is Institute of Electrical and Electronics Engineers (IEEE) 802.16e.

Depending on whether a transmitter (e.g., a base station) receives feedback information from a receiver (e.g., a mobile station), power control schemes are classified into open-loop power control and closed-loop power control in communication systems.

Open-loop power control is a power control scheme in which the transmitter decides on the channel status of the receiver independently without receiving feedback information (for example, channel quality information) and controls power accordingly. The open-loop power control scheme is based on the reciprocity of downlink and uplink channels. The channel reciprocity means that the downlink and uplink channels experience similar path attenuation between the transmitter and the receiver. That is, the open-loop power control scheme is a transmission scheme in which the transmitter itself estimates the signal reception quality of the receiver based on the reciprocity between the downlink and uplink channels, calculates a required transmit power based on the estimation, and transmits a signal with the transmit power.

Closed-loop power control is a power control scheme in which the transmitter controls transmit power based on channel information received from the receiver on a feedback channel without determining the channel quality independently, as compared to the open-loop power control. Despite the shortcoming of overhead from the feedback channel, the closed-loop power control scheme can control the power of a transmission signal more accurately than the open-loop power control scheme since the transmitter gets knowledge of the channel quality of the receiver.

Meanwhile, the future-generation communication system adopts a multi-hop relay scheme in order to enable high-speed communications and accommodate a larger number of calls. Since communications are conducted between a fixed base station (BS) and a mobile station (MS) via a direct link, a highly reliable radio communication link can be easily established between them. However, due to the fixedness of the base station, the configuration of a wireless network is less flexible, making it difficult to provide an efficient communication service in a radio environment characterized by a fluctuating change in traffic distribution and required calls. To avert this problem, the communication system employs a multi-hop relay scheme using fixed or mobile relay stations. The multi-hop communication system can reconfigure a network fast according to an environmental change and operate the entire wireless network efficiently. Therefore, a self-configurable radio network can be implemented in the communication system, taking the form of a multi-hop communication system.

The multi-hop communication system expands cell coverage and increases system capacity by multiple hops. When the channel status between a base station and a mobile station is poor, a multi-hop relay path established with the mobile station via relay stations and thus a better radio channel can be provided to the mobile station. Hence, the use of multiple hops enables provisioning of a more efficient communication service to mobile stations in a shadowing area experiencing severe shielding due to buildings. Also, the multi-hop relay scheme provides a high-speed data channel to a mobile station at a cell boundary in a poor channel status and expands cell coverage.

For the base station to transmit data to the mobile station via a relay station (RS) in a multi-hop relay path, a data transmission power control scheme is required for the base station and the relay station. That is, there exists a need for a transmission power control scheme that efficiently utilizes limited channels, for example, a channel between the base station and the RS and a channel between the relay station and the mobile station, and increases data rates in the multi-hop communication system.

SUMMARY OF THE INVENTION

To address the above-discussed deficiencies of the prior art, it is a primary aspect of exemplary embodiments of the present invention to address at least the problems and/or disadvantages and to provide at least the advantages described below. Accordingly, an aspect of exemplary embodiments of the present invention is to provide a system and method for controlling power in a communication system.

Another aspect of exemplary embodiments of the present invention is to provide a system and method for controlling power in a multi-hop communication system.

A further aspect of exemplary embodiments of the present invention is to provide a system and method for controlling power so as to increase channel use efficiency and data rate in a multi-hop communication system.

In accordance with an aspect of exemplary embodiments of the present invention, there is provided a method for controlling power in a communication system having a base station, a mobile station for receiving a communication service from the base station, and a relay station for providing a multi-hop path between the base station and the mobile station, in which the relay station calculates the capacity of a first channel between the base station and the relay station, the mobile station calculates the capacity of a second channel between the relay station and the mobile station and notifies the relay station of the capacity of the second channel, and the relay station calculates a power control value according to the capacity of the first channel and the capacity of the second channel.

In accordance with another aspect of exemplary embodiments of the present invention, there is provided a system for controlling power in a communication system having a base station, a mobile station for receiving a communication service from the base station, and a relay station for providing a multi-hop path between the base station and the mobile station, in which the mobile station calculates the capacity of a second channel between the relay station and the mobile station and notifies the relay station of the capacity of the second channel, and the relay station calculates the capacity of a first channel between the base station and the relay station and calculates a power control value according to the capacity of the first channel and the capacity of the second channel.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
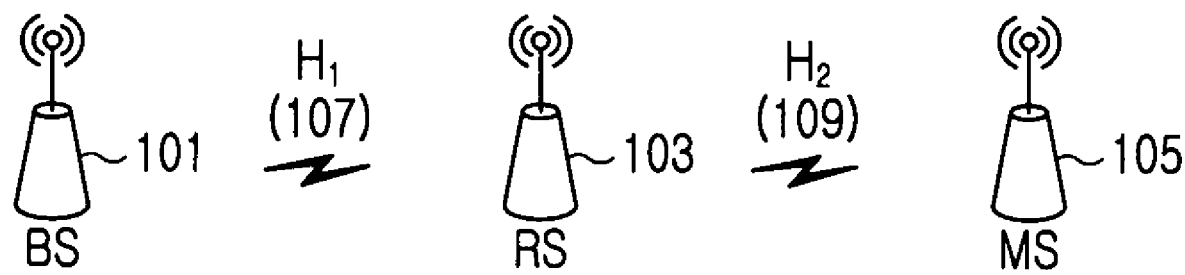
FIG. 1 illustrates the configuration of a multi-hop communication system according to an exemplary embodiment of the present invention.
Figure 2:
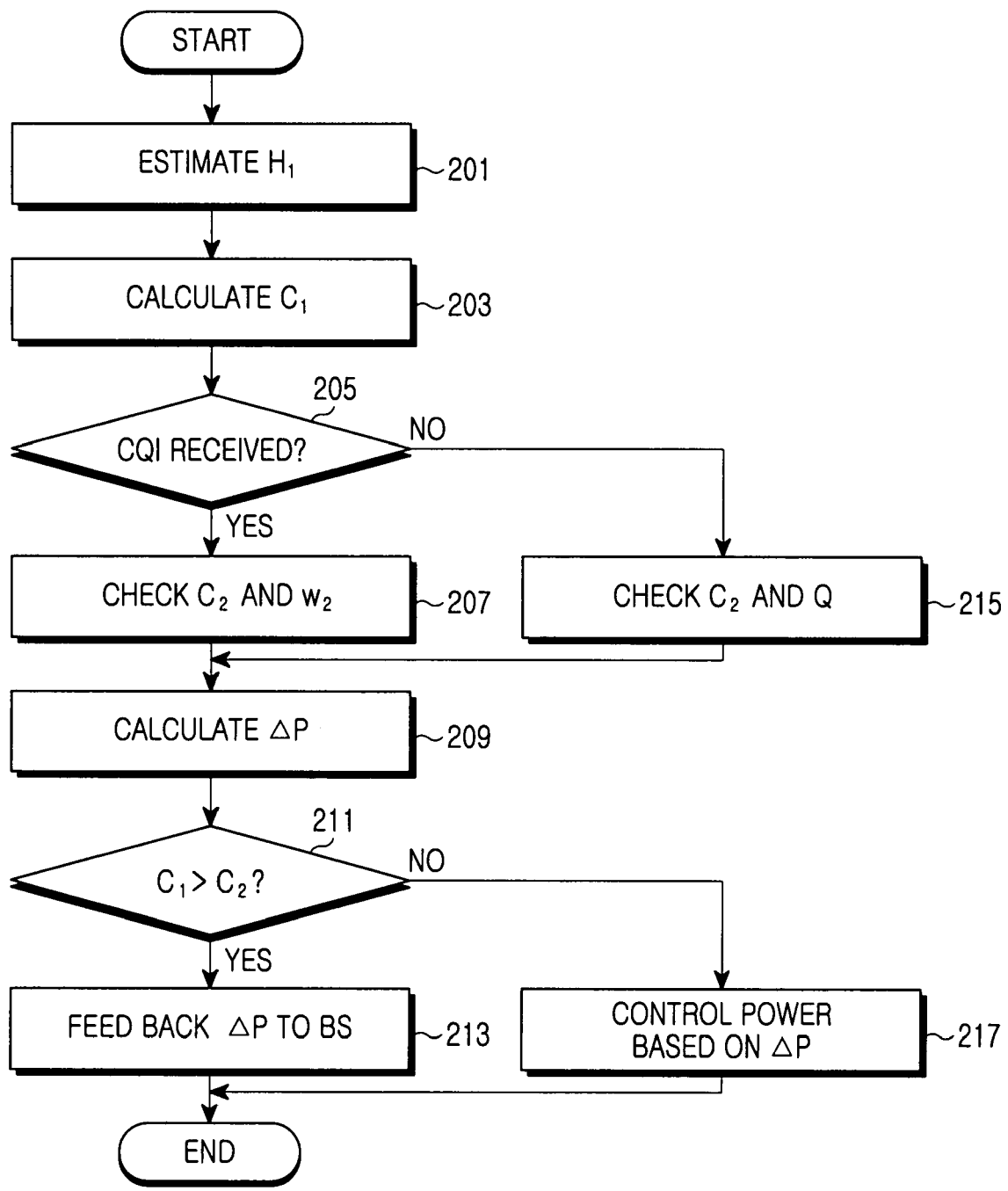
FIG. 2 is a flowchart of an operation of a relay station in the multi-hop communication system according to an exemplary embodiment of the present invention.
Figure 3:
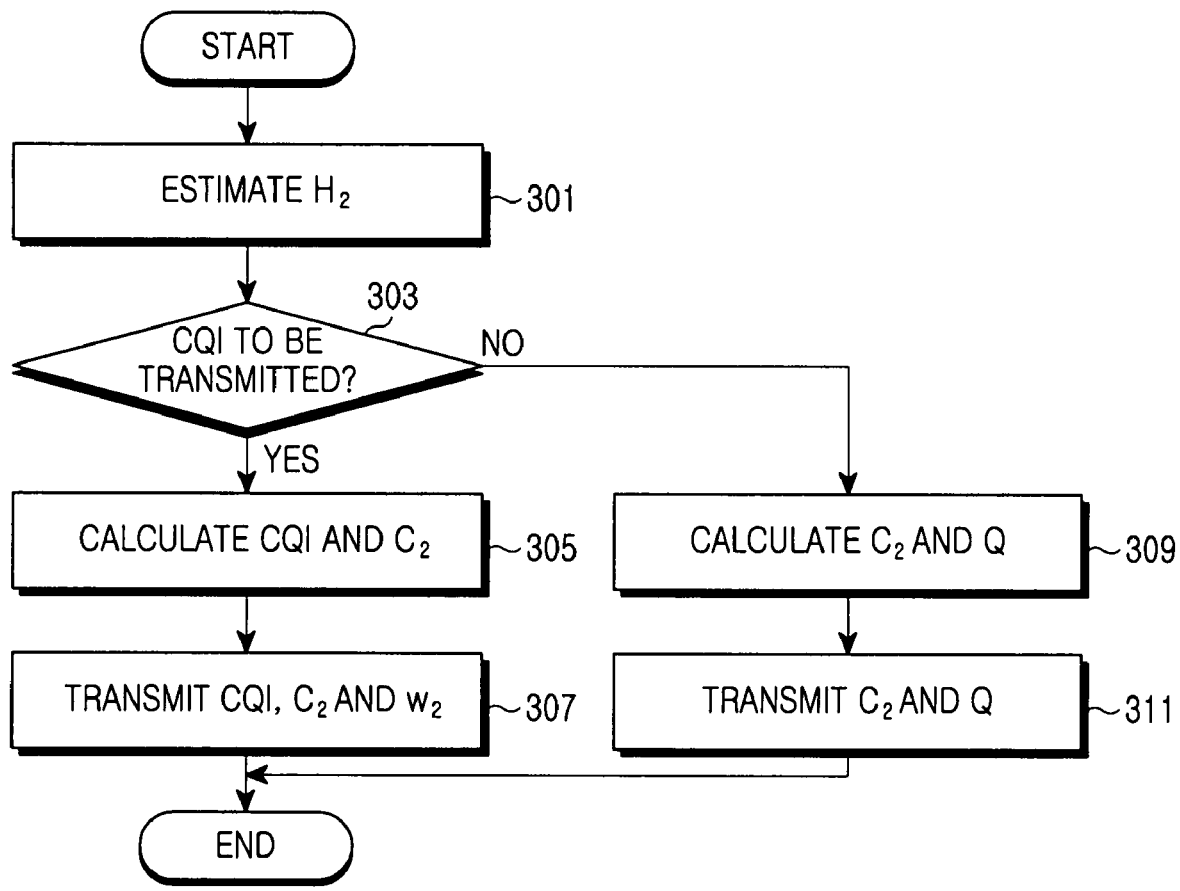
FIG. 3 is a flowchart of an operation of a mobile station in the multi-hop communication system according to an exemplary embodiment of the present invention.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a method and system for controlling power in a communication system, for example, in a multi-hop communication system. While the exemplary embodiments of the present invention are provided in the context of a multi-hop communication system, it is to be clearly understood that the power control system and method of the present invention are also applicable to other communication systems.

The exemplary embodiments of the present invention also provide a system and method for controlling the transmit power of a base station (BS) and a relay station (RS) when the base station transmits data to a mobile station (MS) in a multi-hop relay path (i.e., via the RS in a multi-hop communication system). The exemplary embodiments of the present invention provide a system and method for controlling transmit power so as to efficiently utilize limited channels, for example, a channel between a base station and a relay station and a channel between the relay station and a mobile station (MS), and increase data rate in a multi-hop communication system. In the exemplary embodiments of the present invention, the transmit power of the base station (BS) and the relay station (RS) is controlled based on the capacities of the BS-RS channel (first channel) and the RS-MS channel (second channel).

FIG. 1 illustrates the configuration of a multi-hop communication system according to an exemplary embodiment of the present invention.

Referring to FIG. 1, the multi-hop communication system includes a base station (BS) 101 for covering a predetermined cell, a mobile station (MS) 105 for receiving a communication service from the BS 101, and a relay station (RS) 103 for relaying between the BS 101 and the MS 105, that is, providing a multi-hop relay path between the BS 101 and the MS 105. A channel between the BS 101 and the RS 103 (i.e., a first channel) is denoted by $H_1$ 107 and a channel between the RS 103 and the MS 105 (i.e., a second channel) is denoted by $H_2$ 109.

The RS 103 receives a pilot signal from the BS 101 and calculates the channel capacity of the first channel $H_1$ 107 by estimating the first channel $H_1$ 107 as follows:

$$C_1 = \sum_{n=1}^{N_{ir}} \log_2(1 + g_{ir}(n)P_{ir}(n)). \quad \text{[Eqn. 1]}$$

In Equation 1, $C_1$ denotes the capacity of the first channel $H_1$ 107, $N_{ir}$ denotes the total number of the channels between the BS 101 and the RS 103, i denotes the index of the BS 101, r denotes the index of the RS 103, $g_{ir}(n)$ denotes the gain of channel n among the channels between the BS 101 and the RS 103, that is, the gain of the channel calculated by Singular Value Decomposition (SVD), and $P_{ir}(n)$ denotes the transmit power with which the BS 101 transmits data to the RS 103 on channel n.

The MS 105 receives a pilot signal from the RS 103 and estimates the channel of each antenna by calculating the strength of the pilot signal. The MS 105 calculates a signal-to-interference and noise ratio (SINR) or a carrier-to-interference and noise ratio (CINR) based on the pilot signal strength and generates channel quality information (CQI) corresponding to the SINR or CINR. Then, the MS 105 determines whether to feed back the CQI to the RS 103 on a feedback channel. The case where the MS 105 feeds back the CQI to the RS 103, that is, the RS 103 gets knowledge of the channel status of the second channel $H_2$ 109 and the case where the MS 105 does not feed back the CQI to the RS 103, that is, the RS 103 has no knowledge of the channel status of the second channel $H_2$ 109 will be described in great detail.

In the case where the MS 105 feeds back the CQI to the RS 103, it receives a pilot signal from the RS 103 and calculates the capacity of the second channel $H_2$ 109 by estimating the second channel $H_2$ 109, as follows:

$$C_2 = \sum_{n=1}^{N_{rj}} \log_2(1 + g_{rj}(n)P_{rj}(n)). \quad \text{[Eqn. 2]}$$

In Equation 2, $C_2$ denotes the capacity of the second channel $H_2$ 109, $N_{rj}$ denotes the total number of the channels between the RS 103 and the MS 105, r denotes the index of the RS 103, j denotes the index of the MS 105, $g_{rj}(n)$ denotes the gain of channel n among the channels between the RS 103 and the MS 105, that is, the gain of an independent channel calculated by SVD, and $P_{rj}(n)$ denotes the transmit power with which the RS 103 transmits data to the MS 105 on channel n.

After calculating the capacity of the second channel $H_2$ 109 by Equation 2, the MS 105 transmits feedback information including CQI, $C_2$ and $w_2$ on the feedback channel to the RS 103. $w_2$ denotes a waterfilling level for the second channel $H_2$ 109.

Upon receipt of the feedback information from the MS 105 on the feedback channel, the RS 103 compares the channel capacity $C_1$ calculated by Equation 1 with the received channel capacity $C_2$ and calculates a power control value according to the comparison result. More specifically, if $C_1$ is larger than $C_2$, the RS 103 calculates a power control value appropriate for this case and transmits feedback information with the power control value to the BS 101. The BS 101 controls its transmit power for data transmission to the RS 103 based on the power control value.

If $C_1$ is less than $C_2$, the RS 103 calculates a power control value appropriate for this case and controls its transmit power for data transmission to the MS 105 based on the power control value. The power control value $\Delta P$ is computed by:

$$\Delta P = (2 \log 2) \cdot w \cdot \Delta C. \quad [\text{Eqn. 3}]$$

In Equation 3, w denotes a waterfilling level which is a waterfilling level $w_1$ for the first channel $H_1$ 107 or the waterfilling level $w_2$ for the second channel $H_2$ 109, $\Delta C$ denotes the difference between $C_1$ and $C_2$. When $C_1$ is larger than $C_2$, an operation for calculating $\Delta P$ in the RS 103 will be described with reference to Equations 4 and 5.

When $C_1$ is larger than $C_2$, $\Delta C$ is given as:

$$\Delta C = C_1 - C_2, \quad [\text{Eqn. 4}]$$

and $\Delta P$ is computed by:

$$\Delta P = (2 \log 2) \cdot w_1 \cdot (C_1 - C_2). \quad [\text{Eqn. 5}]$$

In Equation 5, $\Delta P$ denotes a power control value for data transmission from the BS 101 to the RS 103 and $w_1$ denotes a waterfilling level for the first channel $H_1$ 107. The RS 103 then transmits feedback information including $\Delta P$ to the BS 101. Thus the BS 101 controls the power of data to be transmitted to the RS 103 according to $\Delta P$.

When $C_1$ is less than $C_2$, $\Delta C$ is given as:

$$\Delta C = C_2 - C_1, \quad [\text{Eqn. 6}]$$

and $\Delta P$ is computed by:

$$\Delta P = (2 \log 2) \cdot w_2 \cdot (C_2 - C_1). \quad [\text{Eqn. 7}]$$

In Equation 7, $\Delta P$ denotes a power control value for data transmission from the RS 103 to the MS 105 and $w_2$ denotes a waterfilling level for the second channel $H_2$ 109. The RS 103 then controls the power of data to be transmitted to the MS 105 according to $\Delta P$.

Now a description will be made of the case where the MS 105 does not feed back a CQI to the RS 103. The MS 105 receives a pilot signal from the RS 103 and calculates the capacity of the second channel $H_2$ 109 by estimating the second channel $H_2$ 109, as follows:

$$C_2 = \sum_{n=1}^{N_{rj}} \log_2 \left(1 + g_{rj}(n) \frac{\sum_{n=1}^{N_{rj}} P_{rj}(n)}{N}\right). \quad [\text{Eqn. 8}]$$

In Equation 8, $C_2$ denotes the capacity of the second channel $H_2$ 109, $N_{rj}$ denotes the total number of the channels between the RS 103 and the MS 105, r denotes the index of the RS 103, j denotes the index of the MS 105, $g_{rj}(n)$ denotes the gain of channel n among the channels between the RS 103 and the MS 105, and $$\sum_{n=1}^{N_{rj}} P_{rj}(n)$$

denotes the average of power allocated to all the channels between the RS 103 and the MS 105.

After calculating the capacity of the second channel $H_2$ 109 by Equation 8, the MS 105 transmits feedback information including $C_2$ and a metric for power control of the second channel $H_2$ 109 between the RS 103 and the MS 105. The metric Q is given as:

$$Q = \sum_{n=1}^{N_{rj}} \frac{1}{\frac{N_{rj}}{g_{rj}} + P_{rj}(n)}. \quad [\text{Eqn. 9}]$$

In Equation 9, Q denotes a value corresponding to the waterfilling level $w_2$ for the case where the MS 105 feeds back a CQI to the RS 103 (i.e., for the second channel $H_2$ 109), $N_{rj}$ denotes the total number of the channels between the RS 103 and the MS 105, r denotes the index of the RS 103, j denotes the index of the MS 105, $g_{rj}(n)$ denotes the gain of channel n among the channels between the RS 103 and the MS 105, calculated by SVD, and $P_{rj}(n)$ denotes transmit power for data transmission from the RS 103 to the MS 105 on channel n.

Upon receipt of $C_2$ and Q in the feedback information from the MS 105 on the feedback channel, the RS 103 compares the channel capacity $C_1$ calculated by equation (1) with the received channel capacity $C_2$ and calculates $\Delta P$. More specifically, if $C_1$ is larger than $C_2$, the RS 103 calculates a power control value appropriate for this case and transmits feedback information with the power control value to the BS 101. The BS 101 controls its transmit power for data transmission to the RS 103 based on the power control value.

If $C_1$ is less than $C_2$, the RS 103 calculates a power control value appropriate for this case and controls its transmit power for data transmission to the MS 105 based on the power control value. The power control value $\Delta P$ is computed by:

$$\Delta P = \frac{\Delta C}{Q}. \quad [\text{Eqn. 10}]$$

In Equation 10, $\Delta C$ denotes the difference between $C_1$ and $C_2$ and Q denotes the metric for power control of the second channel $H_2$ 109 between the RS 103 and the MS 105. An operation for calculating $\Delta P$ in the case where $C_1$ is larger than $C_2$ will be described with reference to, Equations 11 and 12.

When $C_1$ is larger than $C_2$, $\Delta C$ is given as:

$$\Delta C = C_1 - C_2, \quad \text{[Eqn. 11]}$$

and $\Delta P$ is computed by:

$$\Delta P = (C_1 - C_2/Q). \quad \text{[Eqn. 12]}$$

In Equation 12, $\Delta P$ denotes the power control value for data transmission from the RS 103 to the MS 105 and Q denotes the metric for power control of the second channel $H_2$ 109 between the RS 103 and the MS 105. The RS 103 then transmits feedback information including $\Delta P$ to the BS 101. Thus the BS 101 controls the power of data to be transmitted to the RS 103 according to $\Delta P$.

When $C_1$ is less than $C_2$, $\Delta C$ is given as:

$$\Delta C = C_2 - C_1, \quad \text{[Eqn. 13]}$$

and $\Delta P$ is computed by:

$$\Delta P = (C_2 - C_1/Q). \quad \text{[Eqn. 14]}$$

In Equation 14, $\Delta P$ denotes the power control value for data transmission from the RS 103 to the MS 105 and Q denotes the metric for power control of the second channel $H_2$ 109 between the RS 103 and the MS 105. The RS 103 then controls the power of data to be transmitted to the MS 105 according to $\Delta P$.

FIG. 2 is a flowchart of an operation of the RS in the multi-hop communication system according to an exemplary embodiment of the present invention.

Referring to FIG. 2, the RS receives a pilot signal from the BS and estimates the first channel $H_1$ in step 201. In step 203, the RS calculates the capacity $C_1$ of the first channel $H_1$ by Equation 1. The RS monitors reception of a CQI of the second channel $H_2$ in step 205. That is, the RS determines whether feedback information received from the MS on the feedback channel includes a CQI.

Upon receipt of the CQI from the MS, (i.e., if the RS has knowledge of the channel status of the second channel $H_2$), the RS checks $C_2$ and $w_2$ included in the feedback information in step 207 and proceeds to step 209.

If the RS has not received the CQI from the MS, that is, the RS does not have knowledge of the channel status of the second channel $H_2$, the RS checks $C_2$ and Q included in the feedback information in step 205 and goes to step 209. In step 209, the RS calculates $\Delta P$ using $C_2$ and $w_2$ or $C_2$ and Q.

Specifically, if the RS receives the CQI and checks $C_2$ and $w_2$, it calculates $\Delta P$ by:

$$\Delta P = \begin{cases} (2\log 2) \cdot w_1 \cdot (C_1 - C_2) & \text{if } C_1 > C_2 \\ (2\log 2) \cdot w_2 \cdot (C_2 - C_1) & \text{if } C_1 < C_2 \end{cases}. \quad \text{[Eqn. 15]}$$

If the RS does not receive the CQI and checks $C_2$ and Q, it calculates $\Delta P$ by:

$$\Delta P = \begin{cases} (C_1 - C_2)/Q & \text{if } C_1 > C_2 \\ (C_2 - C_1)/Q & \text{if } C_1 < C_2 \end{cases}. \quad \text{[Eqn. 16]}$$

In step 211, the RS compares $C_1$ with $C_2$. If $C_1$ is larger than $C_2$, the RS transmits feedback information including $\Delta P$ to the BS so that the BS can control the transmit power of data to be transmitted to the RS based on $\Delta P$ in step 213.

If $C_1$ is less than $C_2$, the RS controls the transmit power of data to be transmitted to the MS based on $\Delta P$ in step 217.

FIG. 3 is a flowchart of an operation of the mobile station in the multi-hop communication system according to an exemplary embodiment of the present invention.

Referring to FIG. 3, the MS receives a pilot signal from the RS and estimates the second channel $H_2$ in step 301 and determines whether to transmit a CQI to the RS on the feedback channel in step 303. If the MS determines to transmit the CQI to the RS, it calculates the CQI of $H_2$ and $C_2$ by Equation 2 in step 305 and transmits feedback information including the CQI, $C_2$ and $w_2$ to the RS on the feedback channel in step 307.

If the MS determines not to transmit the CQI to the RS, it calculates $C_2$ by Equation 8 and Q by Equation 9 in step 309 and transmits feedback information including $C_2$ and Q to the RS on the feedback channel in step 311.

As is apparent from the above description, the present invention advantageously increases channel use efficiency and data rate by controlling power in accordance with channel capacities between a BS and an RS and between the RS and an MS in a multi-hop communication system.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling power in a communication system comprising a base station, a mobile station for receiving a communication service from the base station, and a relay station for providing a multi-hop path between the base station and the mobile station, the method comprising:

calculating, by the relay station, a first capacity of a first channel between the base station and the relay station;

receiving, by the relay station, information on a second capacity of a second channel between the relay station and the mobile station; and calculating, by the relay station, a power control value according to the first capacity and the second capacity.

2. The method of claim 1, further comprising:

comparing, by the relay station, the first capacity with the second capacity; and transmitting the power control value to the base station when the first capacity is larger than the second capacity, wherein transmit power for transmission from the base station to the relay station is determined based on the power control value.

3. The method of claim 1, further comprising:

comparing, by the relay station, the first capacity with the second capacity; and controlling transmit power for transmission to the mobile station based on the power control value when the first capacity is less than the second capacity.

4. The method of claim 1, wherein the second capacity is calculated based on an estimate of the second channel from a signal transmitted from the relay station to the mobile station.

5. The method of claim 4, wherein the first capacity is calculated based on a gain and transmit power for each channel between the relay station and the base station.

6. The method of claim 4, wherein the information on the second capacity is received from the mobile station in feedback information that also includes the second capacity, channel quality information and a waterfilling level for the second channel.

7. The method of claim 6, wherein calculating the power control value comprises:
comparing, by the relay station the first capacity with the second capacity included in the feedback information;
calculating, by the relay station, the power control value based on the second capacity and the waterfilling level for the second channel when the first capacity is less than the second capacity; and
controlling, by the relay station, transmit power for transmission to the mobile station based on the power control value.

8. The method of claim 4, wherein the second capacity is calculated based on a metric for the estimate of the second channel.

9. The method of claim 8, wherein the information on the second capacity is received from the mobile station in feedback information that includes the second capacity and the metric for the estimate of the second channel.

10. The method of claim 9, wherein calculating the power control value comprises:
comparing, by the relay station, the first capacity with the second capacity included in the feedback information;
calculating, by the relay station, the power control value based on the first capacity and a waterfilling level for the first channel when the first capacity is larger than the second capacity; and
transmitting the power control value to the base station, wherein the transmit power for transmission from the base station to the relay station is controlled based on the power control value.

11. The method of claim 9, wherein controlling the power control value comprises:
comparing, by the relay station, the first capacity with the second capacity included in the feedback information;
calculating, by the relay station, the power control value based on the second capacity and the metric for the second channel when the first capacity is less than the second capacity; and
controlling, by the relay station, transmit power for transmission to the mobile station based on the power control value.

12. The method of claim 1, wherein the relay station is further configured to calculate the power control value by using at least one of the first capacity, a waterfilling level for the first channel, the second capacity, and a waterfilling level for the second channel, based on the first capacity and second capacity.

13. A system for controlling power in a communication system comprising a base station, a mobile station for receiving a communication service from the base station, and a relay station for providing a multi-hop path between the base station and the mobile station, the system comprising:
the relay station configured to calculate a first capacity of a first channel between the base station and the relay station, receive from the mobile station information on a second capacity of a second channel between the relay station and the mobile station, and calculate a power control value according to the first capacity and the second capacity.

14. The system of claim 13, wherein the relay station is further configured to compare the first capacity with the second capacity, and when the first capacity is larger than the second capacity, calculate the power control value and transmit the power control value to the base station.

15. The system of claim 13, wherein the relay station is further configured to compare the first capacity with the second capacity, and when the first capacity is less than the second capacity, calculate the power control value and control transmit power for transmission to the mobile station based on the power control value.

16. The system of claim 13, wherein the mobile station is configured to calculate the second capacity by estimating the second channel from a signal received from the relay station, and notify the relay station of the second capacity.

17. The system of claim 16, wherein the relay station is further configured to calculate the first capacity based on a gain and transmit power for each channel between the relay station and the base station.

18. The system of claim 17, wherein the mobile station is further configured to transmit feedback information including the second capacity, the channel quality information, and a waterfilling level for the second channel to the relay station.

19. The system of claim 18, wherein the relay station is further configured to compare the first capacity with the second capacity included in the feedback information, and calculate the power control value based on the second capacity and the waterfilling level for the second channel and control transmit power for transmission to the mobile station based on the power control value when the first capacity is less than the second capacity.

20. The system of claim 16, wherein the mobile station is further configured to calculate a metric for the estimated second channel.

21. The system of claim 20, wherein the mobile station is further configured to transmit feedback information including the second capacity and the metric for the estimated second channel to the relay station.

22. The system of claim 21, wherein the relay station is further configured to compare the first capacity with the second capacity included in the feedback information, and calculate the power control value based on the first capacity and a waterfilling level for the first channel and transmit the power control value to the base station when the first capacity is larger than the second capacity, and the base station is further configured to control transmit power for transmission to the relay station based on the power control value.

23. The system of claim 21, wherein the relay station is further configured to compare the first capacity with the second capacity included in the feedback information, and calculate the power control value based on the second capacity and the metric for the second channel and control transmit power for transmission to the mobile station based on the power control value when the first capacity is less than the second capacity.

24. The apparatus of claim 13, wherein the power control value is calculated by using at least one of the first capacity, a waterfilling level for the first channel, the second capacity, and a waterfilling level for the second channel, based on the first capacity and the second capacity.

* * * * *